US012663596B2

(12) United States Patent
Della Pergola et al.

(10) Patent No.: US 12,663,596 B2
(45) Date of Patent: Jun. 23, 2026

(54) PATTERN PROJECTOR

(71) Applicant: APPLE INC., Cupertino, CA (US)

(72) Inventors: Refael Della Pergola, Jerusalem (IL);
Roei Remez, Tel Aviv (IL); **Assaf
Avraham, Givatayim (IL); Yuval Tsur**,
Tel Aviv (IL); Yazan Alnahhas,
Mountain View, CA (US)

(73) Assignee: Apple Inc., Cupertino, CA (US)

( * ) Notice: Subject to any disclaimer, the term of this
patent is extended or adjusted under 35
U.S.C. 154(b) by 333 days.

(21) Appl. No.: 18/321,021

(22) Filed: May 22, 2023

(65) Prior Publication Data

US 2024/0393551 A1     Nov. 28, 2024

(51) Int. Cl.
H04B 10/00     (2013.01)
G02B 6/42      (2006.01)

(52) U.S. Cl.
CPC ......... G02B 6/4249 (2013.01); G02B 6/4204
(2013.01)

(58) Field of Classification Search
CPC .. G02B 6/4249; G02B 6/4204; G02B 5/1809;
G02B 5/1819; G02B 27/1093; G02B
27/30; G02B 1/002; G02B 27/20; G01B
11/25; G03B 21/2033; G03B 21/2013;
G03B 21/206; G03B 21/208
See application file for complete search history.

(56) References Cited

U.S. PATENT DOCUMENTS

| 4,069,463 A | 1/1978 | McGroddy et al. |
| 4,935,939 A | 6/1990 | Liau et al. |
| 5,126,869 A | 6/1992 | Lipchak et al. |
| 5,812,571 A | 9/1998 | Peters |
| 6,055,262 A | 4/2000 | Cox et al. |
| 6,156,980 A | 12/2000 | Peugh et al. |
| 6,597,713 B2 | 7/2003 | Ouchi |
| 6,625,028 B1 | 9/2003 | Dove et al. |
| 6,674,948 B2 | 1/2004 | Yeh et al. |
| 6,936,855 B1 | 8/2005 | Harrah |

(Continued)

FOREIGN PATENT DOCUMENTS

| CN | 205123806 U | 3/2016 |
| CN | 107219711 A | 9/2017 |

(Continued)

OTHER PUBLICATIONS

U.S. Appl. No. 17/221,856 Office Action dated Mar. 20, 2024.

(Continued)

*Primary Examiner* — Agustin Bello

(74) *Attorney, Agent, or Firm* — Meitar Patents Ltd.;
Daniel Kligler

(57)     ABSTRACT

An optoelectronic apparatus includes a semiconductor sub-
strate and multiple arrays of emitters disposed on the semi-
conductor substrate and configured to emit beams of optical
radiation. An optical substrate is mounted over the semi-
conductor substrate. An optical metasurface disposed on the
optical substrate includes multiple optical apertures. Each
aperture is configured to receive, collimate and split the
beams emitted by a respective array of the emitters into a
respective group of collimated sub-beams, so as to direct the
collimated sub-beams toward a target at different, respective
angles to form a pattern of spots on the target.

19 Claims, 9 Drawing Sheets

(56) References Cited

U.S. PATENT DOCUMENTS

| | | | | |
|---|---|---|---|---|
| 6,948,838 | B2* | 9/2005 | Kunstler | F21S 43/315 |
| | | | | 362/520 |
| 7,126,218 | B1 | 10/2006 | Darveaux et al. | |
| 7,271,461 | B2 | 9/2007 | Dutta | |
| 7,303,005 | B2 | 12/2007 | Reis et al. | |
| 7,800,067 | B1 | 9/2010 | Rajavel et al. | |
| 7,949,024 | B2 | 5/2011 | Joseph | |
| 8,050,461 | B2 | 11/2011 | Shpunt et al. | |
| 8,193,482 | B2 | 6/2012 | Itsler | |
| 8,259,293 | B2 | 9/2012 | Andreou | |
| 8,275,270 | B2 | 9/2012 | Shushakov et al. | |
| 8,350,847 | B2 | 1/2013 | Shpunt | |
| 8,355,117 | B2 | 1/2013 | Niclass | |
| 8,405,020 | B2 | 3/2013 | Menge | |
| 8,604,603 | B2 | 12/2013 | Lau et al. | |
| 8,761,495 | B2 | 6/2014 | Freedman et al. | |
| 8,766,164 | B2 | 7/2014 | Sanfilippo et al. | |
| 8,963,069 | B2 | 2/2015 | Drader et al. | |
| 9,024,246 | B2 | 5/2015 | Jiang et al. | |
| 9,052,356 | B2 | 6/2015 | Chu et al. | |
| 9,076,707 | B2 | 7/2015 | Harmon | |
| 9,106,849 | B2 | 8/2015 | Duggal et al. | |
| 9,273,846 | B1* | 3/2016 | Rossi | G02B 3/005 |
| 9,430,006 | B1 | 8/2016 | Hayashida | |
| 9,735,539 | B2 | 8/2017 | Jiang et al. | |
| 9,819,144 | B2 | 11/2017 | Lin et al. | |
| 9,826,131 | B2 | 11/2017 | Alasirnio et al. | |
| 10,034,375 | B2 | 7/2018 | Pyper et al. | |
| 10,103,512 | B2 | 10/2018 | Jiang et al. | |
| 10,305,247 | B2* | 5/2019 | Bills | G01S 7/4817 |
| 10,362,295 | B2 | 7/2019 | Chen et al. | |
| 10,375,330 | B2 | 8/2019 | Rephaeli et al. | |
| 10,401,480 | B1 | 9/2019 | Gaalema et al. | |
| 10,454,241 | B2 | 10/2019 | Jiang et al. | |
| 10,470,307 | B2 | 11/2019 | Pyper et al. | |
| 10,551,886 | B1 | 2/2020 | de la Fuente | |
| 10,881,028 | B1 | 12/2020 | Huang et al. | |
| 11,067,877 | B2* | 7/2021 | Park | H04N 13/239 |
| 11,194,091 | B2* | 12/2021 | Subramanya | F21V 5/004 |
| 11,296,136 | B2 | 4/2022 | Nagai et al. | |
| 11,333,821 | B2* | 5/2022 | Subramanya | F21V 5/007 |
| 11,474,410 | B2* | 10/2022 | Chen | G02F 1/1347 |
| 11,592,726 | B2* | 2/2023 | Engelen | G01B 11/2513 |
| 11,699,715 | B1 | 7/2023 | Alnahhas | |
| 11,710,945 | B2 | 7/2023 | Alnahhas et al. | |
| 11,774,060 | B2* | 10/2023 | Eilertsen | F21V 5/007 |
| | | | | 362/235 |
| 11,979,548 | B2* | 5/2024 | Hsiao | G01B 11/2513 |
| 12,025,771 | B2 | 7/2024 | Diaz et al. | |
| 12,123,589 | B1* | 10/2024 | Tsur | F21V 5/004 |
| 12,222,445 | B2* | 2/2025 | Fabiny | G02B 19/0014 |
| 12,313,812 | B2 | 5/2025 | Remez et al. | |
| 2002/0070443 | A1 | 6/2002 | Mu et al. | |
| 2002/0127752 | A1 | 9/2002 | Thompson et al. | |
| 2002/0176459 | A1 | 11/2002 | Martinsen | |
| 2003/0081385 | A1 | 5/2003 | Mochizuki et al. | |
| 2004/0001317 | A1 | 1/2004 | Getz, Jr. et al. | |
| 2004/0180470 | A1 | 9/2004 | Romano et al. | |
| 2006/0044803 | A1* | 3/2006 | Edwards | F21V 29/89 |
| | | | | 257/E25.02 |
| 2007/0233208 | A1 | 10/2007 | Kurtz et al. | |
| 2007/0262441 | A1 | 11/2007 | Chen | |
| 2008/0240196 | A1 | 10/2008 | Nishida | |
| 2010/0061090 | A1* | 3/2010 | Bergman | F21V 5/007 |
| | | | | 362/231 |
| 2010/0072496 | A1* | 3/2010 | Kobayakawa | H01L 25/0753 |
| | | | | 257/91 |
| 2010/0164079 | A1 | 7/2010 | Dekker et al. | |
| 2010/0208132 | A1 | 8/2010 | Shiraishi | |
| 2010/0278480 | A1* | 11/2010 | Vasylyev | G02B 6/0055 |
| | | | | 385/36 |
| 2011/0026264 | A1 | 2/2011 | Reed et al. | |
| 2011/0278629 | A1 | 11/2011 | McDaniel et al. | |
| 2012/0002293 | A1 | 1/2012 | Du et al. | |

| | | | | |
|---|---|---|---|---|
| 2012/0051384 | A1 | 3/2012 | Geske et al. | |
| 2013/0015331 | A1 | 1/2013 | Birk et al. | |
| 2013/0163627 | A1 | 6/2013 | Seurin | |
| 2013/0170203 | A1* | 7/2013 | Cheng | F21V 5/007 |
| | | | | 362/235 |
| 2013/0342835 | A1 | 12/2013 | Blaksberg | |
| 2014/0185285 | A1* | 7/2014 | Jorgensen | F21V 5/008 |
| | | | | 362/232 |
| 2014/0231630 | A1 | 8/2014 | Rae et al. | |
| 2014/0348192 | A1 | 11/2014 | Prujimboom et al. | |
| 2014/0353471 | A1 | 12/2014 | Raynor et al. | |
| 2015/0036114 | A1* | 2/2015 | Schadt | F21V 7/0083 |
| | | | | 362/241 |
| 2015/0092802 | A1 | 4/2015 | Gronenborn et al. | |
| 2015/0163429 | A1 | 6/2015 | Dai et al. | |
| 2015/0195956 | A1 | 7/2015 | Linderman | |
| 2015/0200222 | A1 | 7/2015 | Webster | |
| 2015/0200314 | A1 | 7/2015 | Webster | |
| 2015/0255955 | A1 | 9/2015 | Wang et al. | |
| 2015/0340841 | A1* | 11/2015 | Joseph | H01S 5/04257 |
| | | | | 372/50.12 |
| 2015/0342023 | A1 | 11/2015 | Refai-Ahmed et al. | |
| 2015/0348865 | A1 | 12/2015 | Vincent et al. | |
| 2016/0025993 | A1 | 1/2016 | Mor et al. | |
| 2016/0298822 | A1* | 10/2016 | Michiels | F21V 7/0066 |
| 2016/0300825 | A1 | 10/2016 | Hoeppel | |
| 2016/0381749 | A1* | 12/2016 | Catalano | F21V 23/04 |
| | | | | 315/297 |
| 2017/0078611 | A1 | 3/2017 | Manico et al. | |
| 2017/0170219 | A1 | 6/2017 | Iwafuchi et al. | |
| 2017/0353012 | A1 | 12/2017 | Barve et al. | |
| 2018/0062345 | A1 | 3/2018 | Bills et al. | |
| 2018/0084241 | A1 | 3/2018 | Chen et al. | |
| 2018/0092241 | A1 | 3/2018 | Rasmussen et al. | |
| 2018/0092253 | A1 | 3/2018 | Qiu et al. | |
| 2018/0239105 | A1 | 8/2018 | Lee et al. | |
| 2018/0267214 | A1* | 9/2018 | Rossi | G02B 27/48 |
| 2018/0310407 | A1 | 10/2018 | Pyper et al. | |
| 2019/0049097 | A1* | 2/2019 | Rossi | F21V 23/003 |
| 2019/0121141 | A1* | 4/2019 | Dykaar | H01S 5/4075 |
| 2019/0129035 | A1 | 5/2019 | Valouch et al. | |
| 2019/0196201 | A1* | 6/2019 | Pierer | H01S 5/4093 |
| 2019/0264890 | A1 | 8/2019 | Chang et al. | |
| 2019/0268068 | A1* | 8/2019 | Dacha | G02B 5/02 |
| 2019/0295264 | A1 | 9/2019 | Petilli | |
| 2019/0324223 | A1 | 10/2019 | Yim et al. | |
| 2019/0326731 | A1 | 10/2019 | Mathai et al. | |
| 2019/0348819 | A1* | 11/2019 | Laflaquiere | H10H 29/142 |
| 2019/0381939 | A1 | 12/2019 | Rafalowski et al. | |
| 2020/0096639 | A1 | 3/2020 | Panas et al. | |
| 2020/0105827 | A1* | 4/2020 | Subramanya | G02B 6/0073 |
| 2020/0228764 | A1* | 7/2020 | Chen | G02F 1/133 |
| 2020/0284883 | A1 | 9/2020 | Ferreira et al. | |
| 2020/0388640 | A1 | 12/2020 | Yu et al. | |
| 2021/0067619 | A1* | 3/2021 | Wang | G03B 21/2033 |
| 2021/0083454 | A1 | 3/2021 | Nakata et al. | |
| 2021/0190291 | A1* | 6/2021 | Huang | F21V 5/008 |
| 2021/0313764 | A1* | 10/2021 | Alnahhas | H01S 5/18347 |
| 2021/0336424 | A1* | 10/2021 | Hegblom | H01S 5/02253 |
| 2022/0120412 | A1* | 4/2022 | Bremerich | F21V 7/09 |
| 2022/0179125 | A1 | 6/2022 | Ren et al. | |
| 2022/0187631 | A1* | 6/2022 | Jang | G02F 1/1396 |
| 2022/0205611 | A1* | 6/2022 | Yousefi | F21V 33/0052 |
| 2022/0317438 | A1 | 10/2022 | Diaz et al. | |
| 2022/0357484 | A1* | 11/2022 | Hu | G02B 27/0012 |
| 2023/0073962 | A1 | 3/2023 | Hauser et al. | |
| 2023/0220974 | A1* | 7/2023 | Eilertsen | G01B 11/2536 |
| | | | | 362/235 |
| 2024/0094437 | A1* | 3/2024 | Remez | G02B 1/02 |
| 2024/0094553 | A1* | 3/2024 | Remez | G02B 27/1086 |
| 2024/0111030 | A1 | 4/2024 | Kobayashi et al. | |
| 2024/0393551 | A1* | 11/2024 | Della Pergola | G02B 27/20 |
| 2025/0321472 | A1 | 10/2025 | Ovadia et al. | |

FOREIGN PATENT DOCUMENTS

| | | |
|---|---|---|
| CN | 108332082 A | 7/2018 |
| CN | 208654319 U | 3/2019 |

(56)                References Cited

FOREIGN PATENT DOCUMENTS

| CN | 110867724 | A  | 3/2020  |
| CN | 210224593 | U  | 3/2020  |
| CN | 106444209 | B  | 5/2020  |
| CN | 110380211 | B  | 5/2021  |
| CN | 113359112 | A  | 9/2021  |
| CN | 110398850 | B  | 4/2023  |
| EP | 0949728   | A1 | 10/1999 |
| WO | 2014087301 | A1 | 6/2014  |
| WO | 2018093730 | A1 | 5/2018  |
| WO | 2018132521 | A1 | 7/2018  |
| WO | 2019149778 | A1 | 8/2019  |
| WO | 2020026616 | A1 | 2/2020  |
| WO | 2020039086 | A1 | 2/2020  |
| WO | 2020074351 | A1 | 4/2020  |

OTHER PUBLICATIONS

U.S. Appl. No. 18/321,025 Office Action dated Apr. 12, 2024.
U.S. Appl. No. 17/221,856 Office Action dated Jun. 24, 2024.
Burrows, "Metalens grows up—Researchers develop a mass-producible, centimeter-scale Metalens for VR, Imaging," Harvard School of Engineering and Applied Sciences, pp. 1-4, Dec. 3, 2019.
Thorlabs, Inc., "Introduction to Diffraction Grating," Optics Selection Guide in Product Catalog, pp. 798-808, years 1999-2023, as downloaded from https://www.thorlabs.com/catalogpages/805.pdf.
Nielsen et al., "Meta Optical Elements—The Technology of Flat Metalenses," Tech Briefs, SAE Media Group, pp. 1-8, Sep. 1, 2022, as downloaded from https://www.techbriefs.com/component/content/article/tb/supplements/bit/features/technology-leaders/46527.
Boulder Nonlinear Systems, "High-Definition Time-of-Flight Imaging," Product Information, pp. 1-10, year 2022, as downloaded from https://web.archive.org/web/20220124203941/https://www.bnonlinear.com/case-studies/high-definition-time-flight-imaging.
Remez et al., U.S. Appl. No. 18/307,820, filed Apr. 27, 2023.
Tsur et al., U.S. Appl. No. 18/321,025, filed May 22, 2023.
CN Application # 2021105284688 Office Action dated Sep. 29, 2023.
Non-Final Office Action, U.S. Appl. No. 18/614,862, dated Feb. 10, 2026.
Notice of References Cited, U.S. Appl. No. 18/614,862, dated Feb. 10, 2026.

* cited by examiner

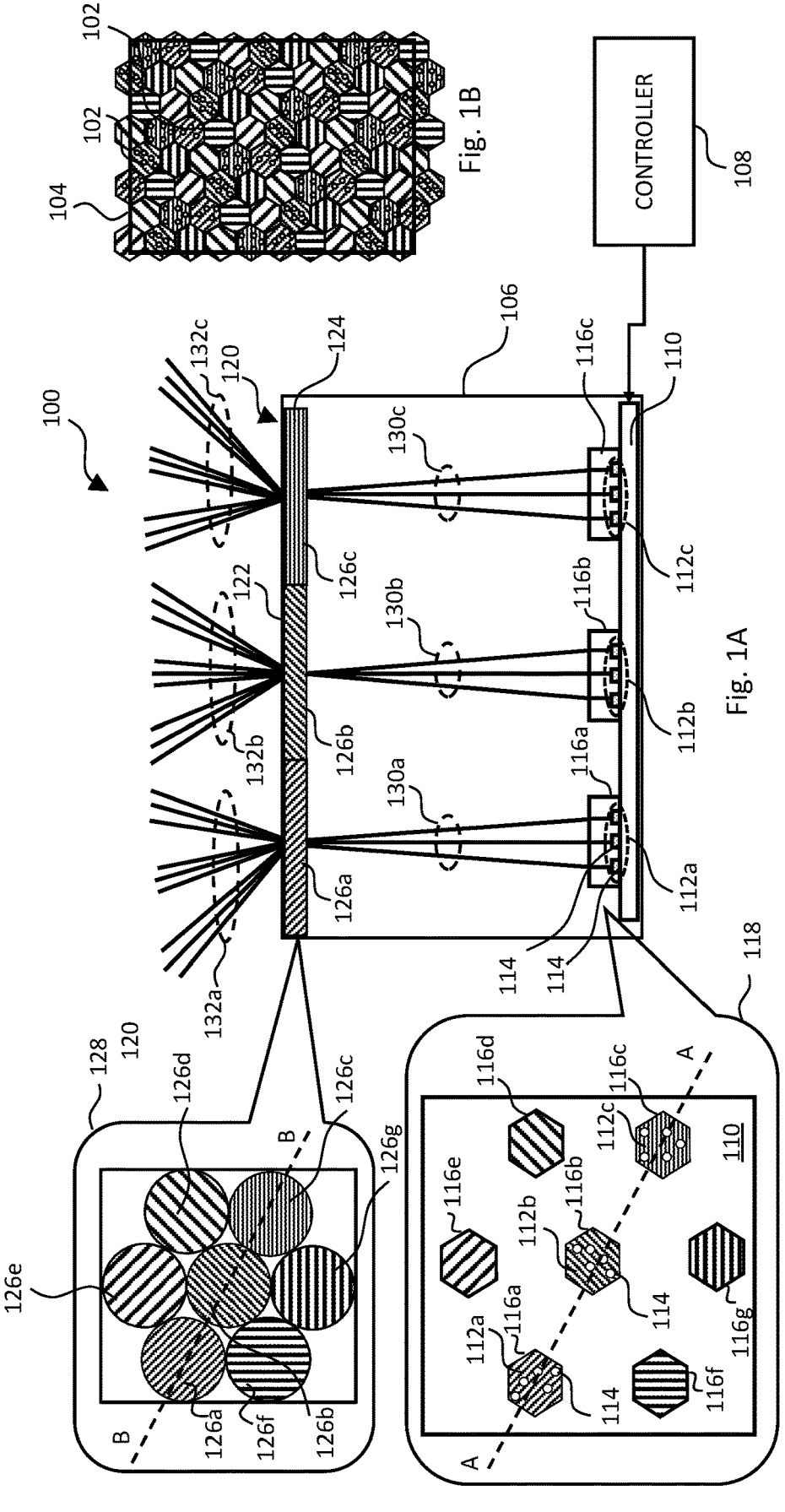

CONTROLLER

CONTROLLER

PATTERN PROJECTOR

FIELD OF THE INVENTION

The present invention relates generally to optoelectronic devices, and particularly to sources of optical radiation.

BACKGROUND

Various sorts of portable computing devices (referred to collectively as "portable devices" in the description), such as smartphones, augmented reality (AR) devices, virtual reality (VR) devices, smart watches, and smart glasses, comprise compact sources of optical radiation. For example, one source may project patterned radiation to illuminate a target region with a pattern of spots for three-dimensional (3D) mapping of the region. Another source may, for example, emit flood radiation, illuminating a target region uniformly over a wide field of view for the purpose of capturing a color or a monochromatic image.

The terms "optical rays," "optical radiation," and "light," as used in the present description and in the claims, refer generally to electromagnetic radiation in any or all of the visible, infrared, and ultraviolet spectral ranges.

Optical metasurfaces are thin layers that comprise a two-dimensional pattern of structures, having dimensions (pitch and thickness) less than the target wavelength of the radiation with which the optical metasurface is designed to interact. Optical elements comprising optical metasurfaces are referred to herein as "metasurface optical elements" (MOEs).

SUMMARY

Embodiments of the present invention that are described hereinbelow provide improved designs and methods for use and fabrication of sources of optical radiation.

There is therefore provided, in accordance with an embodiment of the invention, an optoelectronic apparatus, including a semiconductor substrate and multiple arrays of emitters disposed on the semiconductor substrate and configured to emit beams of optical radiation. An optical substrate is mounted over the semiconductor substrate. An optical metasurface disposed on the optical substrate includes multiple optical apertures. Each aperture is configured to receive, collimate and split the beams emitted by a respective array of the emitters into a respective group of collimated sub-beams, so as to direct the collimated sub-beams toward a target at different, respective angles to form a pattern of spots on the target.

In some embodiments, the apparatus includes multiple lenses disposed between the semiconductor substrate and the optical substrate in alignment with the multiple arrays of emitters and configured to direct the beams emitted by each array onto a respective one of the optical apertures. In one embodiment, the multiple lenses include discrete individual lenses, which are respectively aligned with the multiple arrays of emitters. Alternatively, the multiple lenses are formed as a monolithic unit. The multiple lenses may be configured as a compound lens.

In some embodiments, the apparatus includes one or more dies of semiconductor material, wherein the arrays of emitters are disposed on respective ones of the one or more dies, and the one or more dies are mounted on the semiconductor substrate. In one embodiment, the optical metasurface is configured to project the collimated sub-beams so that the target is tiled by images of at least one of the one or more dies.

Additionally or alternatively, the optical metasurface has a focal plane, and the one or more dies include at least one first die emitting first beams of the optical radiation at the focal plane, so as to form the pattern of spots on the target, and at least one second die emitting second beams of the optical radiation at an emission plane that is displaced by a predetermined distance from the focal plane, so that the second beams illuminate the target with flood illumination. In one embodiment, the at least one first die has a first thickness, and the at least one second die has a second thickness greater than the first thickness by the predetermined distance. In another embodiment, the at least one second die is mounted on a pedestal, which elevates the emission plane of the at least one second die relative to the at least one first die by the predetermined distance.

In other embodiments, the apparatus includes one or more further arrays of emitters, which are disposed on the semiconductor substrate and are configured to emit further beams of radiation, and optical a further optical metasurface, which is configured to receive and split the further beams into diverging sub-beams, and to direct the diverging sub-beams toward the target at different, respective angles to illuminate the target with flood illumination. In a disclosed embodiment, the apparatus includes a controller, which is configured to actuate the apparatus so as to illuminate the target with either the pattern of spots or the flood illumination.

In some embodiments, the arrays of emitters are disposed on a back side of at least one semiconductor die, and the apparatus includes microlenses formed on a front side of the at least one semiconductor die in alignment with the emitters and configured to direct the emitted beams toward the optical metasurface. In one embodiment, each microlens includes a tilted toroidal surface.

In a disclosed embodiment, the pattern of spots includes multiple replicas of the multiple arrays of emitters, wherein the replicas are tiled across the target. Additionally alternatively, the pattern of spots includes multiple replicas of the multiple arrays of emitters, illuminating different, respective zones of the target.

In some embodiments, the emitters include vertical-cavity surface-emission lasers (VCSELs).

In disclosed embodiments, the multiple arrays are disposed on the semiconductor substrate in a hexagonal pattern or in a rectangular pattern.

There is also provided, in accordance with an embodiment of the invention, a method for optical projection, which includes mounting on a semiconductor substrate multiple arrays of emitters configured to emit beams of optical radiation. An optical substrate is mounted over the semiconductor substrate and has an optical metasurface disposed thereon. The optical metasurface includes multiple optical apertures, each aperture configured to receive, collimate and split the beams emitted by a respective array of the emitters into a respective group of collimated sub-beams, so as to direct the collimated sub-beams toward a target at different, respective angles to form a pattern of spots on the target.

The present invention will be more fully understood from the following detailed description of the embodiments thereof, taken together with the drawings in which:

BRIEF DESCRIPTION OF THE DRAWINGS

FIG. 1A is a schematic side view of an optoelectronic apparatus, n accordance with an embodiment of the invention;

FIG. 1B is a schematic frontal view of a far-field pattern of spots on a target projected by the apparatus of FIG. 1A, in accordance with an embodiment of the invention;

DETAILED DESCRIPTION OF EMBODIMENTS

Overview

Figures 2A, 2B, 2C:
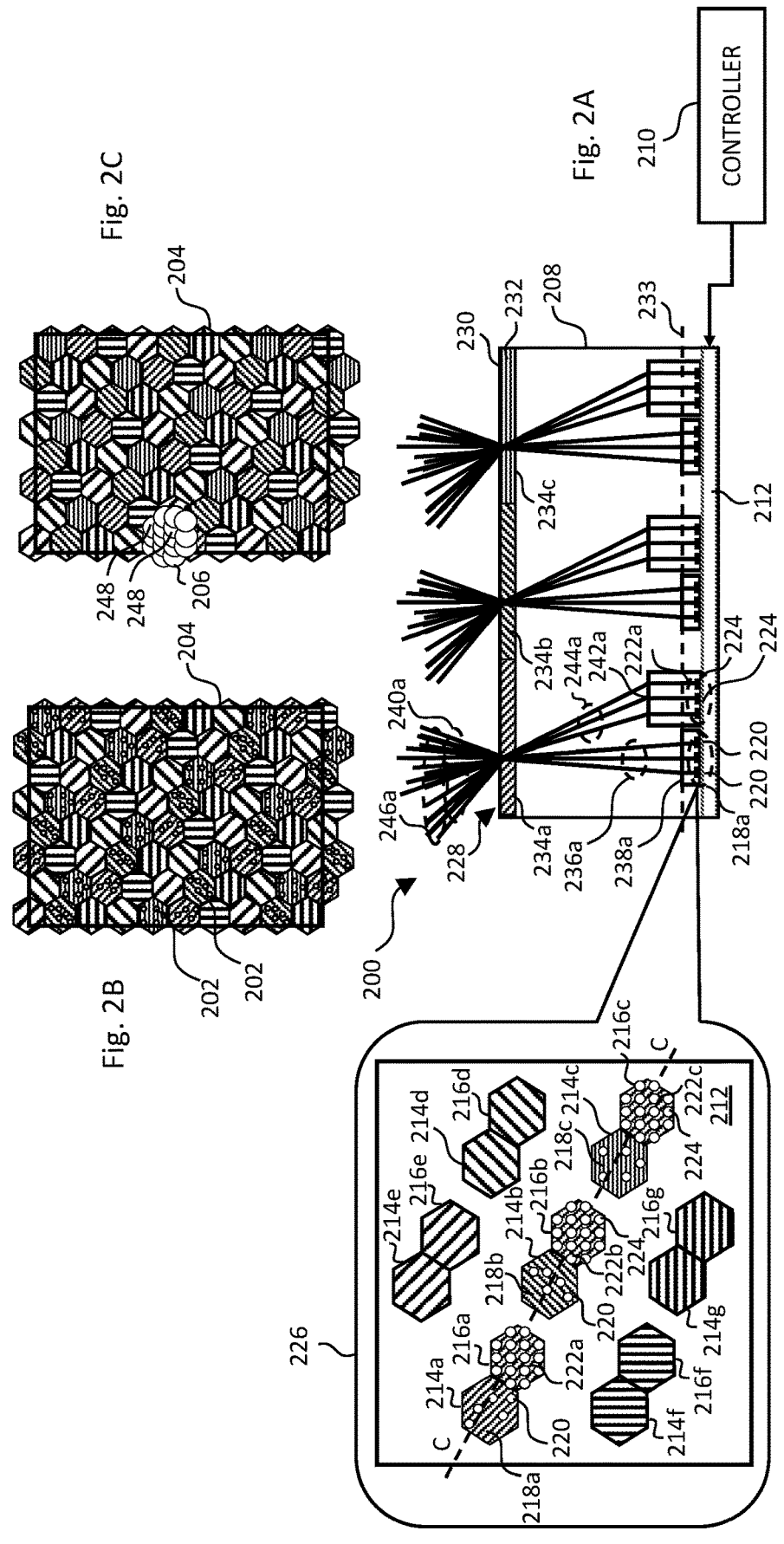
FIG. 2A is a schematic side view of an optoelectronic apparatus, in accordance with an alternative embodiment of the invention.
FIG. 2B is a schematic frontal view of a far-field pattern of spots on a target projected by the apparatus of FIG. 2A, in accordance with an embodiment of the invention.
FIG. 2C is a schematic frontal view of flood illumination on a target projected by the apparatus of FIG. 2A, in accordance with an embodiment of the invention.

Compact structured light projectors that are used to project patterns of spots in portable devices may use a single-element MOE, which splits each of the beams emitted by an array of light sources into multiple sub-beams and projects the beams to form a pattern of spots on a target. To detect the radiation returned from the spots in the pattern with a sufficient signal-to-noise ratio from even a distant target, the emitters in the array emit beams with high optical power. However, high-power beams that are concentrated on a small area of the MOE or any subsequent layers above it, i.e., impinging on the MOE with a high irradiance, may damage the MOE or any of these layers, as well as any other adjacent elements transmitting these beams. There is thus a need to reduce the irradiance on the MOE in a structured light projector while still maintaining high overall signal-to-noise ratio.

Embodiments of the present invention that are described herein address this need by using an MOE, which comprises multiple optical apertures, and multiple emitter arrays. Each emitter array emits optical beams to a respective optical aperture of the MOE, thus spreading out the optical power over a large surface area.

The disclosed embodiments provide optoelectronic apparatus comprising a semiconductor substrate, multiple arrays of emitters disposed on the semiconductor substrate and emitting beams of optical radiation, an optical substrate mounted over the semiconductor substrate, and an MOE comprising multiple optical apertures disposed on the optical substrate. Each optical aperture receives, collimates and splits the beams emitted by a respective array of emitters into a respective group of collimated sub-beams. The MOE directs the collimated sub-beams toward a target at different, respective angles to form a pattern of spots on the target. The power of the emitted optical beams is spread over multiple optical apertures on the MOE, thus reducing the irradiance on the MOE and preventing damage to it and any subsequent layers above the MOE.

In some embodiments, that apparatus also comprises multiple microlenses. Each microlens array is aligned with a respective array of emitters and projects the beams emitted by the array toward the respective optical apertures of the MOE. The employment of microlenses relieves constraints on the design of the apparatus by decoupling the design of the emitter arrays on the semiconductor surface from the design of the MOE, allowing for the design of emitter arrays with smaller size and reduced cost.

In additional embodiments, similar arrangements are used to project flood illumination onto a target.

For the sake of concreteness and clarity, the embodiments described hereinbelow present optical projectors having certain specific configurations, including particular numbers of emitters, dies, and MOEs in certain geometries and with certain dimensions. These configurations are shown and described solely by way of examples. Alternative configurations, based on the principles described herein, will be apparent to those skilled in the art after reading the present description and are considered to be within the scope of the present invention.

Spot Projectors

FIG. 1A is a schematic side view of an optoelectronic apparatus 100, and FIG. 1B is a schematic frontal view of a far-field pattern of spots 102 on a target 104 projected by the apparatus, in accordance with an embodiment of the invention.

Apparatus 100 comprises a spot projector 106 and a controller 108. Projector 106 comprises a semiconductor substrate 110, on which hexagonal III-V semiconductor dies 116a, 116b, 116c, 116d, 116e, 116f, and 116g are mounted. Dies 116a-116c comprise respective arrays 112a, 112b, and 112c of emitters of optical radiation, for example VCSELs (Vertical-Cavity Surface-Emitting Lasers) 114. In the present embodiment, semiconductor substrate 110 comprises a silicon (Si) substrate, and III-V semiconductor dies 116a-116g comprise GaAs (gallium arsenide). GaAs dies 116a-116g are mounted on Si substrate 110 in a VCSEL-on-silicon (VoS) configuration, wherein the Si substrate comprises the drive and control circuits for the VCSELS. A similar Vos configuration can be utilized in the additional apparatuses described hereinbelow. VCSELS 114 are formed on the back sides of GaAs dies 116a-116g and emit beams of optical radiation through the respective dies. In alternative embodiments, other semiconductor materials, as well as other kinds of emitters and emitter configurations, may be used. Microlenses may be formed on the top surfaces of GaAs dies 116a-116g, as shown in the figures that follow, so as to refract and direct the beams emitted by VCSELs 114, for example as illustrated in FIG. 1A.

GaAs dies 116a-116g are shown in a schematic frontal view in an inset 118, with a line A-A corresponding to the plane of FIG. 1A. VCSELs 114 are arranged in non-repeating patterns in arrays 112a-112c in order to enable differentiating far distances from near distances when apparatus 100 is used for 3D mapping of target 104. (The VCSELs on dies 116d-116g are omitted from the figure for the sake of simplicity.) In the current embodiment, the width of each GaAs die 116a-116g is 260 μm, the thickness is 110 μm, and the separations between adjacent dies are 1 mm. Alternative embodiments may have other dimensions for the dies and their separations.

Projector 106 further comprises an MOE 120, comprising an optical metasurface 122 disposed on an optical substrate 124. Optical metasurface 122 comprises optical apertures 126a-126g, which are aligned with respective GaAs dies 116a-116g and contain respective parts of the MOE pattern for diffracting the beams emitted by the VCSELs on the respective dies. (The term "optical aperture" of an MOE will hereinbelow be used to refer to the portion of the MOE defined by the optical aperture. Thus, the optical aperture will have the optical properties of the MOE within the aperture, such as focusing, splitting, and tilting optical beams.) The diameters of optical apertures 126a-126g are 1 mm, thus providing sufficient surface area for the impinging beams of optical radiation from VCSELs 114 to avoid high and potentially damaging irradiance on MOE 120. MOE 120 and optical apertures 126a-126g are shown in a schematic frontal view in an inset 128, with a line B-B corresponding to the plane of FIG. 1A. The spacing between Si substrate 110 and MOE 120 is typically 3 mm, although other spacings may alternatively be used.

Controller 108 is coupled to the drive and control circuits in Si substrate 110. Controller 108 typically comprises a programmable processor, which is programmed in software and/or firmware to drive VCSELS 114. Alternatively or additionally, controller 108 comprises hard-wired and/or programmable hardware logic circuits, which drive VCSELs 114. Although controller 108 is shown in the figures, for the sake of simplicity, as a single, monolithic functional block, in practice the controller may comprise a single chip or a set of two or more chips, with suitable interfaces for outputting the drive signals that are illustrated in the figures and are described in the text. The controllers shown and described in the context of the embodiments that follow are of similar construction.

For projecting a pattern of spots 102 on target 104 (as shown in FIG. 1B), controller 108 drives VCSELs 114 in arrays 112a-112c to emit beams of optical radiation, represented schematically by respective chief rays 130a, 130b, and 130c. The beams are refracted by microlenses as described hereinabove and impinge on respective optical apertures 126a-126c, which split, tilt, and collimate the beams into sub-beams 132a, 132b, and 132c and direct them toward target 104, so that projected images of GaAs dies 116a-116g are tiled on the target as replicas in an interleaved fashion, as shown schematically in FIG. 1B. A compact and efficient tiling is enabled by the hexagonal shapes of dies 116a-116g. In alternative embodiments, other shapes may be used for the dies and VCSEL arrays, leading to tiling with varying degrees of compactness and efficiency.

Combined Spot and Flood Projector

FIG. 2A is a schematic side view of an optoelectronic apparatus 200, FIG. 2B is a schematic frontal view of a far-field pattern of spots 202 on a target 204 projected by the apparatus, and FIG. 2C is a schematic frontal view of flood illumination 206 on the target projected by the apparatus, in accordance with an embodiment of the invention.

Apparatus 200 comprises a combined spot and flood projector 208 and a controller 210. Projector 208 comprises a Si substrate 212, on which two sets of hexagonal GaAs dies are mounted. A first set comprises seven dies 214a, 214b, 214c, 214d, 214e, 214f, and 214g. A second set comprises similarly seven dies 216a, 216b, 216c, 216d, 216e, 216f, and 216g, each adjacent to a respective die 214a-214g. The two sets of dies 214a-214g and 216a-216g differ from each other both in terms of the die thicknesses and the arrangement of the VCSEL arrays formed in the respective dies, as will be detailed hereinbelow.

Dies 214a-214c comprise respective VCSEL arrays 218a, 218b, and 218c, similar to arrays 112a-112c, comprising VCSELs 220. (Similarly to FIG. 1A, VCSELs 220 are not shown in dies 214d-214g for the sake of simplicity.) Dies 216, 216b, and 216c comprise respective dense VCSEL arrays 222a, 222b, and 222c, comprising VCSELs 224, while the arrays in dies 216d-216g are not shown for the sake of simplicity. Arrays 222 are "dense" in the sense that dies 216 are tightly filled with active VCSELs 224, in contrast to arrays 218 on dies 214, in which many of the cells do not contain active VCSELs 220, so that arrays 218 generate patterns of light spots corresponding to the layout of the active VCSELs in arrays 218.

Si substrate 212, GaAs dies 214a-214g, and GaAs dies 216a-216g are shown in a schematic frontal view in an inset 226, with a line C-C in the inset corresponding to the plane of FIG. 2A.

Projector 208 further comprises an MOE 228, similar to MOE 120 (FIG. 1A), comprising an optical metasurface 230 disposed on an optical substrate 232, and having a focal plane 233. Optical metasurface 230 comprises optical apertures 234a, 234b, 234c, 234d, 234e, 234f, and 234g, which are aligned with respective GaAs dies 214a-214g, and are laid out in a similar configuration to optical apertures 126a-126g shown in inset 128. The diameters of optical apertures 234a-234g in this example are 1 mm, thus providing sufficient surface area for avoiding high and potentially damaging irradiance on MOE 228 or subsequent layers above the MOE by beams of optical radiation emitted by VCSELs 220 and 224.

GaAs dies 214a-214g in the present embodiment are thinned, with a thickness of 90 μm, for example, and the top surfaces of these dies are located at focal plane 233 of MOE 228. (Microlenses may be formed on the upper side of the dies, as described hereinabove, so that the beams emitted by VCSELs 220 are directed toward respective apertures 234a-234g of MOE 228 and also that the apparent source of the beams is located at or close to the top surface of each die. Microlenses are shown explicitly in some of the figures that follow.) Thus the beams of optical radiation emitted by VCSELs 220, as represented by chief rays 236a emitted by the VCSELs in VCSEL array 218a from a top surface 238a, are tilted, split, and collimated by aperture 234a of MOE 228 into sub-beams 240a and form discrete spots 202 on target 204.

GaAs dies 216a-216g, however, have a greater thickness, for example 250 μm, displacing their respective top surfaces from focal plane 233. Thus, for example, the beams emitted by VCSELs 224 of array 222a from a top surface 242a, represented by chief rays 244a, are split, tilted and defocused by aperture 234a of MOE 228 into diverging sub-beams 246a, and spots 248 formed on target 204 are blurred. This blur, combined with the dense VCSELs 224 in VCSEL array 222*a*, leads to the target being illuminated by uniform flood illumination 206. In alternative embodiments, other thicknesses for the GaAs dies may be used, as long as their height differences are sufficient to blur the spots illuminated by VCSELs 224.

Alternative Spot Projectors

Figures 3A, 3B:
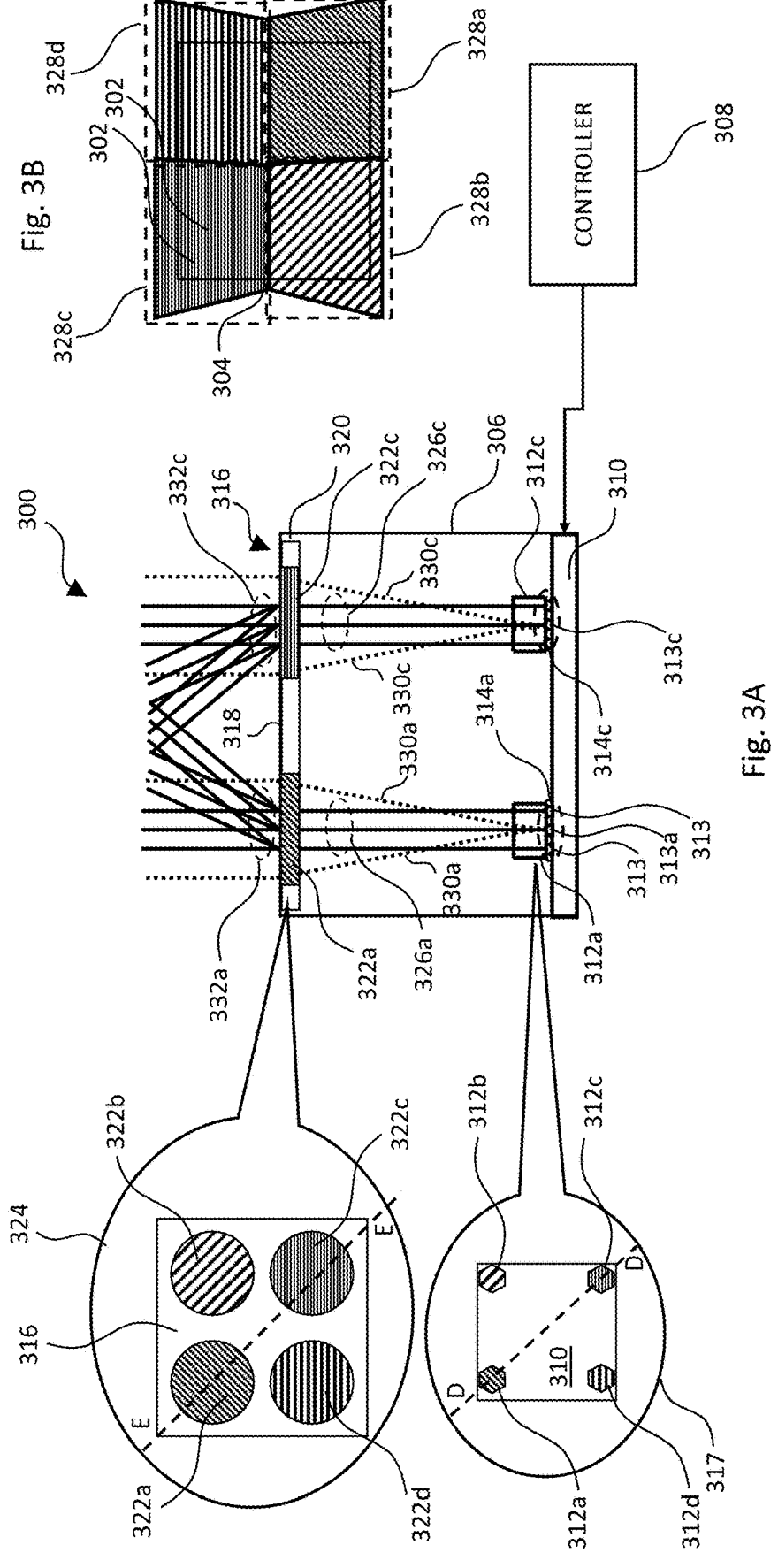
FIG. 3A is a schematic side view of an optoelectronic apparatus, in accordance with another embodiment of the invention.
FIG. 3B is a schematic frontal view of a far-field pattern of spots on a target projected by the apparatus of FIG. 3A, in accordance with an embodiment of the invention.

FIG. 3A is a schematic side view of an optoelectronic apparatus 300, and FIG. 3B is a schematic frontal view of a far-field pattern of spots 302 on a target 304 projected by the apparatus, in accordance with an embodiment of the invention.

Apparatus 300 comprises a spot projector 306 and a controller 308, similar to controller 108 (FIG. 1A). Projector 306 comprises a Si substrate 310 comprising drive and control circuits. Four GaAs dies 312*a*, 312*b*, 312*c*, and 312*d* are mounted on the Si substrate in a VOS configuration, with the GaAs dies comprising VCSELs 313 in respective VCSEL arrays 314*a*, 314*b*, 314*c*, and 314*d*. Si substrate 310 and GaAs dies 312*a*-312*d* are shown in a schematic frontal view in an inset 317. A line D-D in the frontal view corresponds to the plane of FIG. 3A. (For the sake of simplicity, VCSEL arrays 314*a*-314*d* are not shown in the frontal view.) The widths of GaAs dies 312*a*-312*d* are 380 μm in the present example, and their center-to-center spacings in the two orthogonal directions are 1.96 mm. In alternative embodiments, other dimensions and spacings for the GaAs dies may be used.

Projector 306 further comprises an MOE 316, comprising an optical metasurface 318 disposed on an optical substrate 320. Optical metasurface 318 comprises optical apertures 322*a*, 322*b*, 322*c*, and 322*d*, which are aligned with respective GaAs dies 312*a*-312*d*. MOE 316 is shown in a schematic frontal view in an inset 324, with a line E-E corresponding to the plane of FIG. 3A. The diameters of optical apertures 322*a*-322*d* are 1.66 mm, thus providing sufficient surface area for the impinging beams of optical radiation from VCSELs 313 to avoid high and potentially damaging irradiance on MOE 316 or subsequent layers above the MOE.

When driven by controller 308, VCSELs 313 of VCSEL arrays 314*a*-314*d* emit beams of optical radiation. The beams emitted by arrays 314*a* and 314*c* are shown schematically by their respective chief rays 326*a* and 326*c*. The beams represented by chief rays 326*a* and 326*c* impinge on respective optical apertures 322*a* and 322*c*, which collimate, tilt, and split the beams into respective sub-beams 332*a* and 332*c* and direct them toward target 304, illuminating the target by respective spot patterns 328*a* and 328*c*. The collimation of the optical beams is shown by marginal rays 330*a* and 330*c* emitted by respective VCSELs 313*a* and 313*c*. Beams emitted by VCSEL arrays 314*b* and 314*d* form respective spot patterns 328*b* and 328*d* on target 304.

FIG. 3B schematically shows spot patterns 328*a*-328*d* arranged on target 304, with their respective edges touching but with minimal overlap. (Because of the small scale of the figure, only the areas of the spot patterns are shown and not the individual spots.) Depending on the distance of target 304 from projector 306, spot patterns 328*a*-328*d* may either be completely separated or overlapping at their edges. Spot patterns 328*a*-328*d* formed by the beams from respective, different emitter arrays thus illuminate substantially separate areas of target 304. This illumination scheme, termed "zonal illumination," differs from the scheme shown in FIG. 1B, wherein the spot patterns from different emitter arrays are tiled in an interleaved fashion.

Figures 4A, 4B:
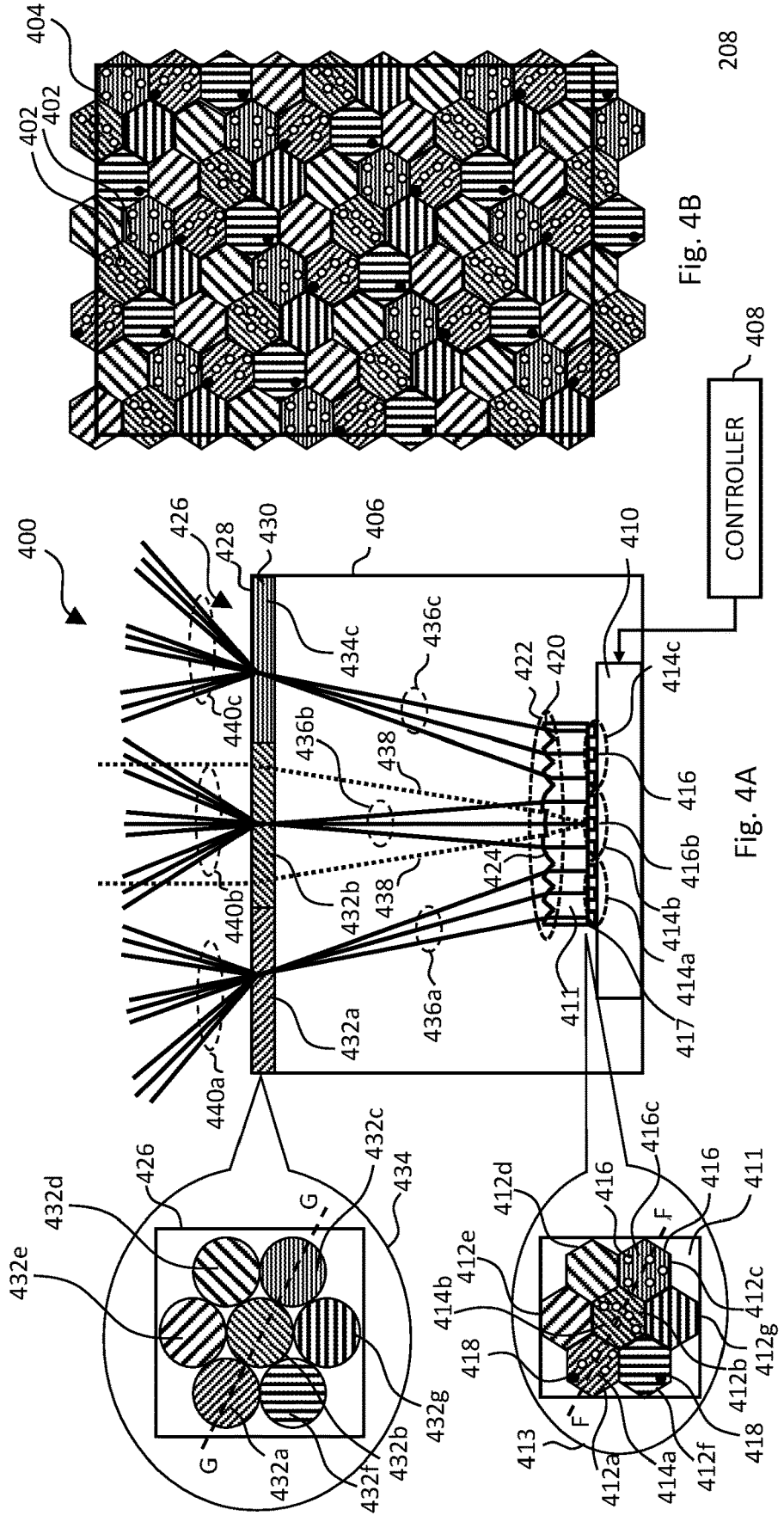
FIG. 4A is a schematic side view of an optoelectronic apparatus, in accordance with yet another embodiment of the invention.
FIG. 4B is a schematic frontal view of a far-field pattern of spots on a target projected by the apparatus of FIG. 4A, in accordance with an embodiment of the invention.

FIG. 4A is a schematic side view of an optoelectronic apparatus 400, and FIG. 4B is a schematic frontal view of a far-field pattern of spots 402 on a target 404 projected by the apparatus, in accordance with an embodiment of the invention.

Apparatus 400 comprises a spot projector 406 and a controller 408, similar to controller 108 (FIG. 1A). Projector 406 comprises a Si substrate 410, comprising drive and control circuits, and a single GaAs die 411 mounted on the Si substrate in a VOS configuration. GaAs die 411 comprises seven hexagonal sections 412*a*, 412*b*, 412*c*, 412*d*, 412*e*, 412*f*, and 412*g*, shown in a schematic frontal view in an inset 413, with a line F-F in the inset corresponding to the plane of FIG. 4A. Sections 412*a*, 412*b*, and 412*c* comprise respective emitter arrays 414*a*, 414*b*, and 414*c*, comprising VCSELs 416 (marked by open circles). VCSELs 416 are disposed on a back side 417 of GaAs die 411, facing Si substrate 410. Sections 412*a* and 412*f* additionally comprise VCSELs 418, termed "probing emitters" and marked with filled circles. VCSELs 418 are either lit or not lit and can be used for security purposes. VCSELs 416, used for 3D mapping of target 404, are arranged in non-repeating patterns in order to enable differentiating far distances from near distances, similarly to emitters 114 of apparatus 100 (FIG. 1A). VCSELs 416 in sections 412*d*-412*g* are not shown for the sake of simplicity.

As described hereinabove, VCSEL arrays 414*a*-414*c* are all disposed on a single, small GaAs die 411, rather than in multiple dies, such as VCSEL arrays 112 of apparatus 100. Other embodiments may similarly be produced using either a single GaAs die or multiple dies. Using a single GaAs die typically requires a more pronounced steering of beams than using multiple dies, as is seen by comparing the beam paths in FIG. 4 to those in FIG. 1A, for example.

A microlens array 422 is etched on a top side 420 of GaAs die 411 after the die has been thinned. Microlens array 422 comprises microlenses 424, wherein each microlens comprises a tilted toroidal surface and is aligned with a respective VCSEL array. Microlenses 424 are designed to refract the beams of optical radiation emitted by VCSELS 416 so as to satisfy the beam-steering requirements of a single-die implementation, as will be detailed hereinbelow. Typical sags of the microlenses (heights of the microlens profiles) are of the order of 1 μm with a maximal sag of 5 μm, and the diameter of each microlens is typically 15 μm in the present example.

Projector 406 further comprises an MOE 426, comprising an optical metasurface 428 disposed on an optical substrate 430. Optical metasurface 428 comprises optical apertures 432*a*, 432*b*, 432*c*, 432*d*, 432*e*, 432*f*, and 432*g*. MOE 426 is shown in a schematic frontal view in an inset 434, with a line G-G corresponding to the plane of FIG. 4A. The diameters of optical apertures 432*a*-432*g* are 1 mm in this example, thus providing sufficient surface area for the impinging beams of optical radiation from VCSELs 416 to avoid high irradiance on MOE 426.

When driven by controller 408, VCSELs 416 of VCSEL arrays 414*a*-414*c* emit respective beams of optical radiation through GaAs die 411, shown schematically by their respective chief rays 436*a*, 436*b*, and 436*c*. The beams, represented by chief rays 436*a*-436*c*, are refracted by microlens array 422 and projected from the small area of GaAs die 411 as diverging beams toward respective optical apertures 432*a*-432*c*. The diverging beams impinge on respective optical apertures 432*a*-432*c*, which collimate, tilt, and split the beams into sub-beams 440*a*, 440*b*, and 440*c* and direct them toward target 404, illuminating the target with spots

402. The collimation of the optical beams is shown by marginal rays 438 emitted by a VCSEL 416*b* at the center of array 414*b*.

Microlens array 422 and MOE 426 are designed so that the beams of optical radiation emitted by VCSELs 416 tile target 404 with a repeating and interleaving pattern of images of sections 412*a*-412*g*.

Alternative Spot and Flood Projector

Figures 5A, 5B, 5C:
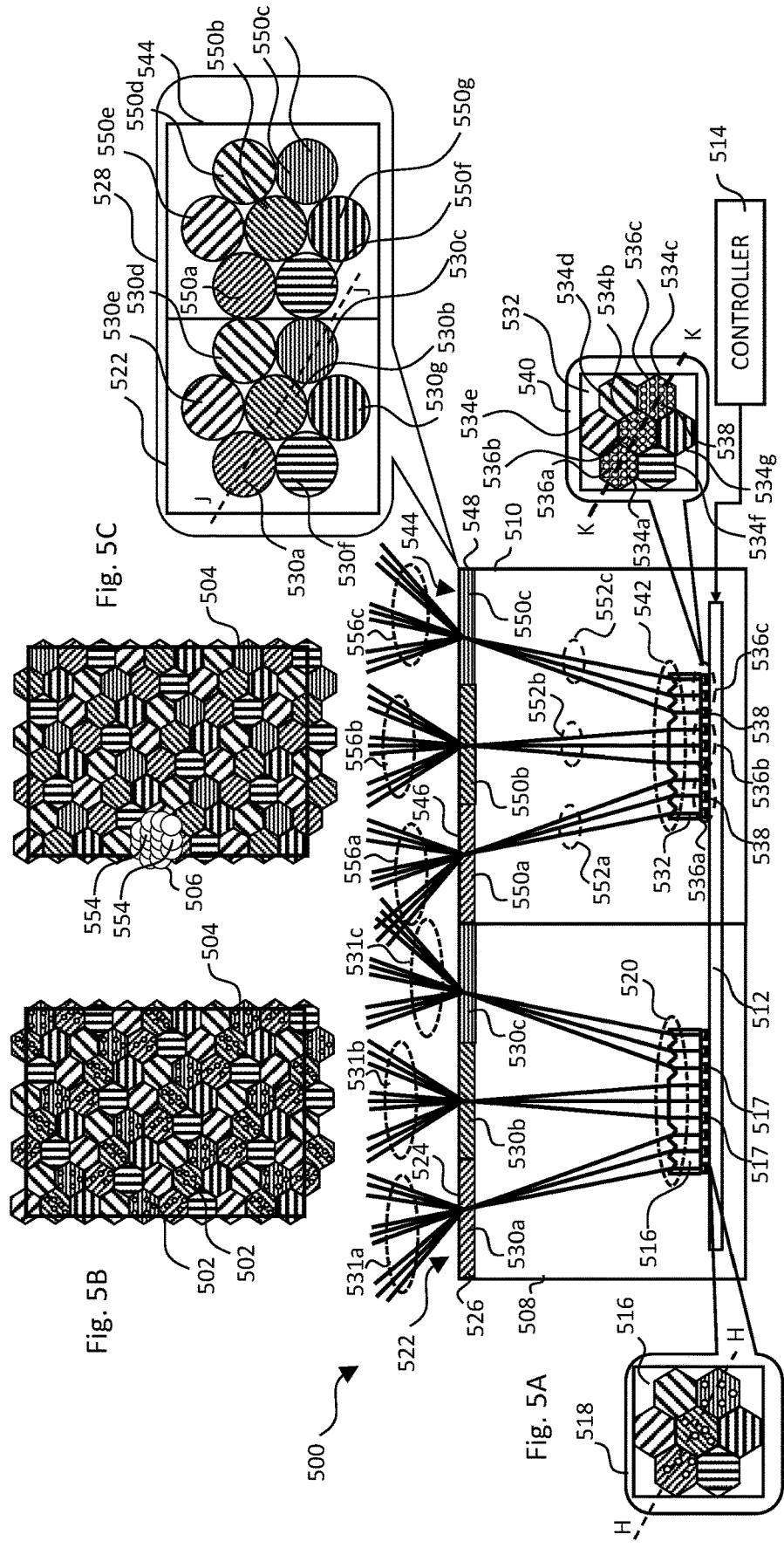
FIG. 5A is a schematic side view of an optoelectronic apparatus, in accordance with an alternative embodiment of the invention.
FIG. 5B is a schematic frontal view of a far-field pattern of spots on a target projected by the apparatus of FIG. 5A, in accordance with an embodiment of the invention.
FIG. 5C is a schematic frontal view of flood illumination on a target projected by the apparatus of FIG. 5A, in accordance with an embodiment of the invention.

FIG. 5A is a schematic side view of an optoelectronic apparatus 500, FIG. 5B is a schematic frontal view of a far-field pattern of spots 502 on a target 504 projected by the apparatus, and FIG. 5C is a schematic frontal view of flood illumination 506 on the target projected by the apparatus, in accordance with an embodiment of the invention.

Apparatus 500 comprises a spot projector 508 and a flood projector 510, sharing a common Si substrate 512, and a controller 514.

Spot projector 508 comprises a GaAs die 516 mounted on Si substrate 512. Die 516 is similar to die 411 (FIG. 4A), comprising seven hexagonal sections, with arrays of VCSELs 517 shown on three of the sections. GaAs die 516 is shown in a schematic frontal view in an inset 518. For the sake of clarity of the figure, the labels of the sections and the VCSEL arrays on die 516 are omitted. A line H-H in inset 518 corresponds to the plane of FIG. 5A. GaAs die 516 also comprises a microlens array 520, similar to microlens array 422 (FIG. 4A). Spot projector 508 furthermore comprises an MOE 522, comprising an optical metasurface 524 disposed on an optical substrate 526. MOE 522, shown (together with an MOE 544, detailed hereinbelow) in a schematic frontal view in an inset 528, comprises optical apertures 530*a*-530*g* within optical metasurface 524, similar to optical apertures 432*a*-432*g* (FIG. 4A). A line J-J in inset 528 corresponds to the plane of FIG. 5A. Optical apertures 530*a*-530*g* are designed to collimate the beams of optical radiation emitted from VCSELs 517 in GaAs die 516 and directed by microlens array 520. When controller 514 drives VCSELs 517 in GaAs die 516, the emitted beams are split, tilted, and collimated into respective sub-beams 531*a*, 531*b*, and 531*c*, which are directed to target 504 similarly to beams 436*a*-436*c* in FIG. 4A, and illuminate the target with spots 502.

Flood projector 510 comprises a GaAs die 532 mounted on Si substrate 512. Die 532 comprises seven hexagonal sections 534*a*, 534*b*, 534*c*, 534*d*, 534*e*, 534*f*, and 534*g*. Sections 534*a*, 534*b*, and 534*c* comprise dense arrays 536*a*, 536*b*, and 536*c* of VCSELs 538. (Dense VCSEL arrays in sections 534*d*-534*g* are not shown for the sake of simplicity.) Die 532 is shown in a schematic frontal view in an inset 540, with a line K-K in the frontal view corresponding to the plane of FIG. 5A. Die 532 also comprises an etched microlens array 542, similar to microlens array 520.

Flood projector 510 further comprises MOE 544, comprising an optical metasurface 546 on an optical substrate 548. MOE 544, shown in a schematic frontal view in inset 528, comprises optical apertures 550*a*-550*g* within optical metasurface 546. Optical apertures 550*a*-550*g* are designed not to collimate the optical beams emitted by VCSELs 538 in GaAs die 532, but rather cause them to diverge. Controller 514 drives VCSELs 538 in arrays 536*a*-536*c*, which emit beams of radiation. The beams are refracted by microlens array 542 into diverging beams, represented by chief rays 552*a*-552*c*, and directed toward respective optical apertures 550*a*-550*c*. Optical apertures 550*a*-550*c* split and tilt these beams, and direct them toward target 504 as respective diverging sub-beams 556*a*, 556*b*, and 556*c*, illuminating the target with dense blurred and overlapping spots 554, forming flood illumination 506.

The diameters of optical apertures 550*a*-550*g*, as well as those of optical apertures 550*a*-550*c*, are typically 1 mm in the present example, thus providing sufficiently large areas for the impinging beams for avoiding damage on the MOEs. Although MOE 522 and MOE 544 are shown as having separate respective optical substrates 526 and 548, they may alternatively be disposed on a common optical substrate.

Figure 6:
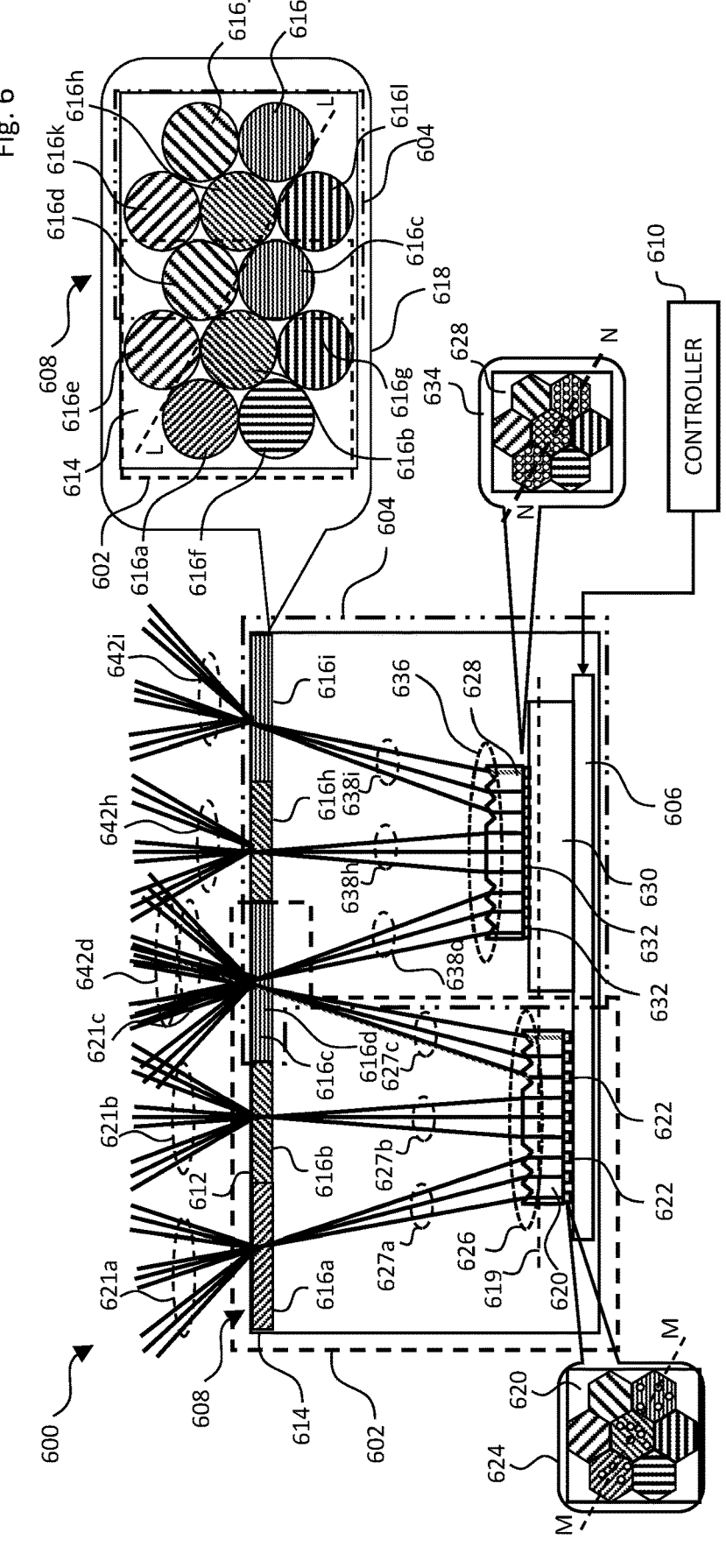
FIG. 6 is a schematic side view of an optoelectronic apparatus, in accordance with an embodiment of the invention.

FIG. 6 is a schematic side view of an optoelectronic apparatus 600, in accordance with an embodiment of the invention. Apparatus 600 comprises a spot projector 602 and a flood projector 604 comprising a common Si substrate 606 and a common MOE 608, and a controller 610.

MOE 608 comprises an optical metasurface 612 disposed on an optical substrate 614, with twelve optical apertures 616*a*-6161, shown in a schematic frontal view in an inset 618. A line L-L in inset 618 corresponds to the plane of FIG. 6. All twelve optical apertures 616*a*-6161 of MOE 608 have the same focal length and thus a common focal plane 619. As detailed hereinbelow, both spot and flood illumination are achieved using MOE 608 with its twelve identical optical apertures, rather than using a combination of two different MOEs 522 and 544 (FIG. 5A) with a total of fourteen optical apertures and with different focal lengths for the two MOEs.

Spot projector 602 comprises a GaAs die 620 mounted on Si substrate 606. Die 620 is similar to die 516 (FIG. 5A), comprising seven hexagonal sections comprising arrays of VCSELs 622. GaAs die 620 is shown in a schematic frontal view in an inset 624, with a line M-M corresponding to the plane of FIG. 6. GaAs die 620 also comprises a microlens array 626, similar to microlens array 520 (FIG. 5A).

When controller 610 drives VCSELs 622, the emitted beams are refracted by microlens array 626 into beams represented by chief rays 627*a*, 627*b*, and 627*c*. Microlens array 626 directs these beams toward respective optical Optical apertures 616*a*-apertures 616*a*, 616*b*, and 616*c*. 616*c* collimate, tilt and split the impinging beams into respective sub-beams 621*a*, 621*b*, 621*c*, similarly to beams 436*a*-436*c* in FIG. 4A, direct them toward a target, and illuminate the target with a spot pattern (not shown in this figure).

Flood projector 604 comprises a GaAs die 628 mounted on a pedestal 630, which in turn is mounted on Si substrate 606. (Alternatively, Si substrate 606 and pedestal 630 may be formed by, for example, etching from a single piece of Si.) Die 628 is similar to die 532 (FIG. 5A), comprising seven hexagonal sections, which comprise dense arrays of VCSELs 632. GaAs die 628 is shown in a schematic frontal view in an inset 634, with a line N-N corresponding to the plane of FIG. 6. GaAs die 628 also comprises a microlens array 636, similar to microlens array 520 (FIG. 5A).

When controller 610 drives VCSELs 632, the emitted beams are refracted by microlens array 636 into beams represented by chief rays 638*d*, 638*h*, and 638*l*. Microlens array 636 directs these beams toward respective optical apertures 616*d*, 616*h*, and 616*i*. (Element 616*d* is behind element 616*c* in the side view of FIG. 6.) Optical apertures 616*d*, 616*h*, and 616*i* tilt and split the impinging beams into respective sub-beams 642*d*, 642*h*, and 642*i*, but do not collimate them due to the elevation of GaAs die 628 by pedestal 630 to well above focal plane 619. Thus the beams directed toward a target by optical apertures 616*d*, 616*h*, and 616*i* diverge and illuminate the target with defocused (blurred) spots. As, in addition to the blur, the spots originate from dense arrays of VCSELs 632, the target is illuminated by even and broad flood illumination, similar to flood illumination 506 (FIG. 5C).

Spot Projectors with Additional Lenses

Figures 7A, 7B:
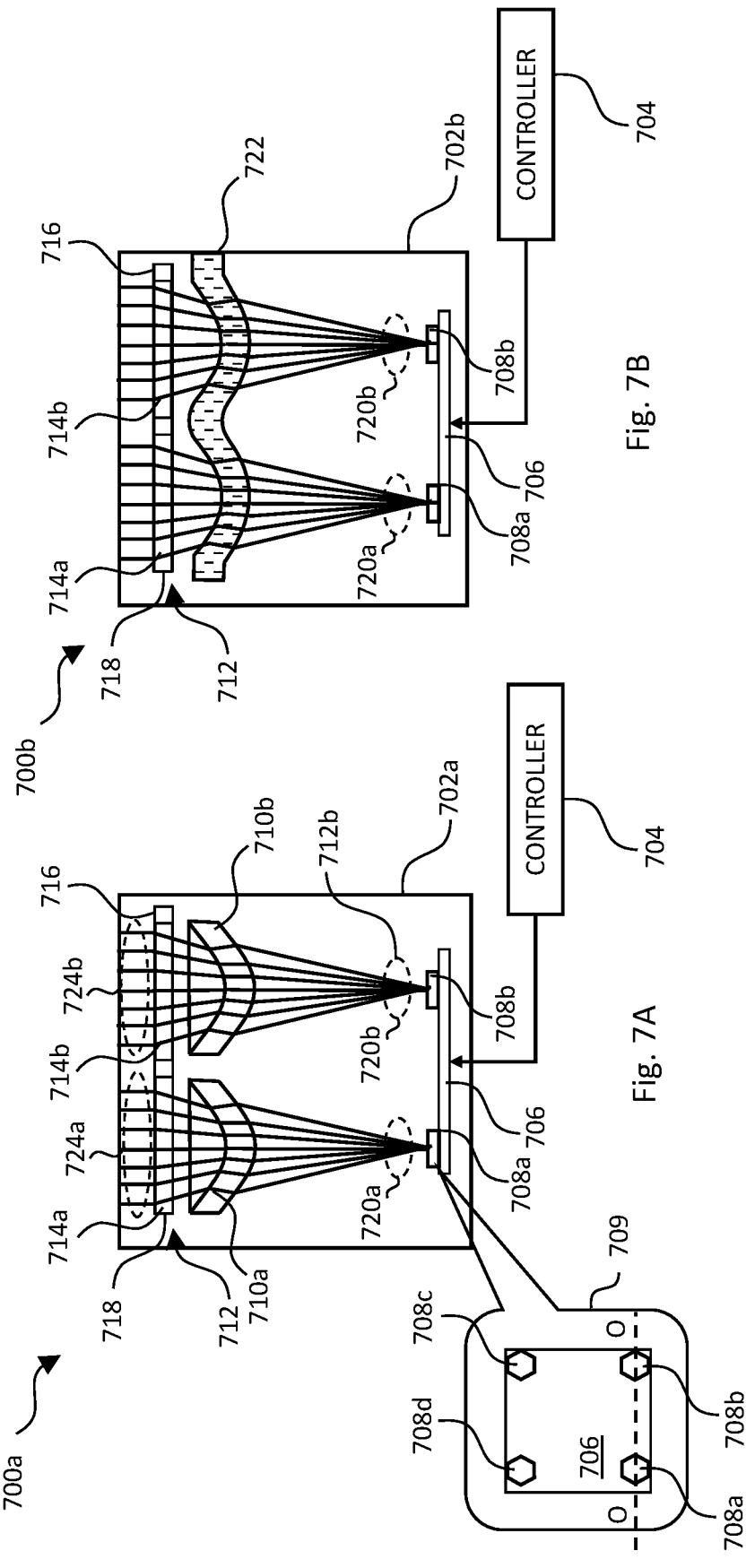
FIGS. 7A and 7B are schematic side views of optoelectronic apparatuses, in accordance with additional embodiments of the invention.

FIGS. 7A and 7B are schematic side views of respective optoelectronic apparatuses 700*a* and 700*b*, in accordance with additional embodiments of the invention. Similar or identical items in apparatuses 700*a* and 700*b* are indicated by the same labels.

Optoelectronic apparatus 700*a* comprises a spot projector 702*a* and a controller 704. Spot projector 702*a* comprises a Si substrate 706, on which four GaAs dies 708*a*, 708*b*, 708*c*, and 708*d* are mounted, similarly to GaAs dies 312*a*-312*d* (FIG. 3A). A schematic frontal view of Si substrate 706 with GaAs dies 708*a*-708*d* is shown in an inset 709, where a line O-O corresponds to the plane of FIG. 7A. Each GaAs die 708*a*-708*d* comprises an array of VCSELs (not shown in FIG. 7A for the sake of simplicity). Spot projector 702*a* further comprises respective optical lenses over dies 708*a*-708*d*, of which only lenses 710*a* and 710*b* are shown in the figure, and an MOE 712, comprising an optical metasurface 716 disposed on an optical substrate 718. Optical metasurface 716 comprises optical apertures 714*a*, 714*b*, . . . . Optical lenses 710*a*, 710*b*, . . . , as well as optical apertures 714*a*, 714*b*, . . . , are aligned with respective GaAs dies 708*a*-708*d*. (Similarly to apparatus 200 in FIG. 2A, microlenses may be formed on the upper side of the dies so that the apparent source of the beams is located at or close to the top surface of each die.)

Optical lenses 710*a*, 710*b*, . . . may be formed to reduce the optical aberrations of the beams emitted by the VCSELs on GaAs dies 708*a*-708*d*. Alternatively, the optical aberrations may be reduced by an additional MOE, either disposed on the bottom side of MOE 712, or fabricated on a separate substrate, which is either positioned adjacent to MOE 712 or cemented to it.

When controller 704 drives the VCSELs in arrays 708*a*-708*d*, the VCSELs of each array emit respective sets of beams 720*a*, 720*b*, . . . . (Although each array 708*a*-708*d* comprises several VCSELs, the beams from only one VCSEL are shown for the sake of clarity.) Beams 720*a*, 720*b*, . . . , are refracted by respective lenses 710*a*, 710, . . . , and directed onto respective optical apertures 714*a*, 714*b*, . . . . The optical apertures collimate, tilt, and split the beams into respective sub-beams 724*a*, 724*b*, . . . , and direct the sub-beams toward a target, illuminating the target with spot pattern (the target not shown in the figure). Lenses 710*a*, 710*b*, . . . , are designed optically so as to reduce the sizes of the spots projected onto the target, thus increasing the signal-to-noise ratio when detecting the reflections of the spots in, for example, 3D mapping. Additionally, the use of lenses 710*a*, 710*b*, . . . , may relieve the alignment requirements for spot projector 702*a*.

Optoelectronic apparatus 700*b* in FIG. 7B comprises a spot projector 702*b* and controller 704. Spot projector 702*b* is identical to spot projector 702*a* in FIG. 7A, with the exception that the four discrete optical lenses 710*a*, 710*b*, . . . , have been replaced by a monolithic plastic lens 722, which replicates the functions of the discrete lenses. The monolithic design of lens 722 and the choice of plastic material can reduce the fabrication costs and further relieve the alignment requirements for projector 702*b*, as compared to projector 702*a*.

Figure 8:
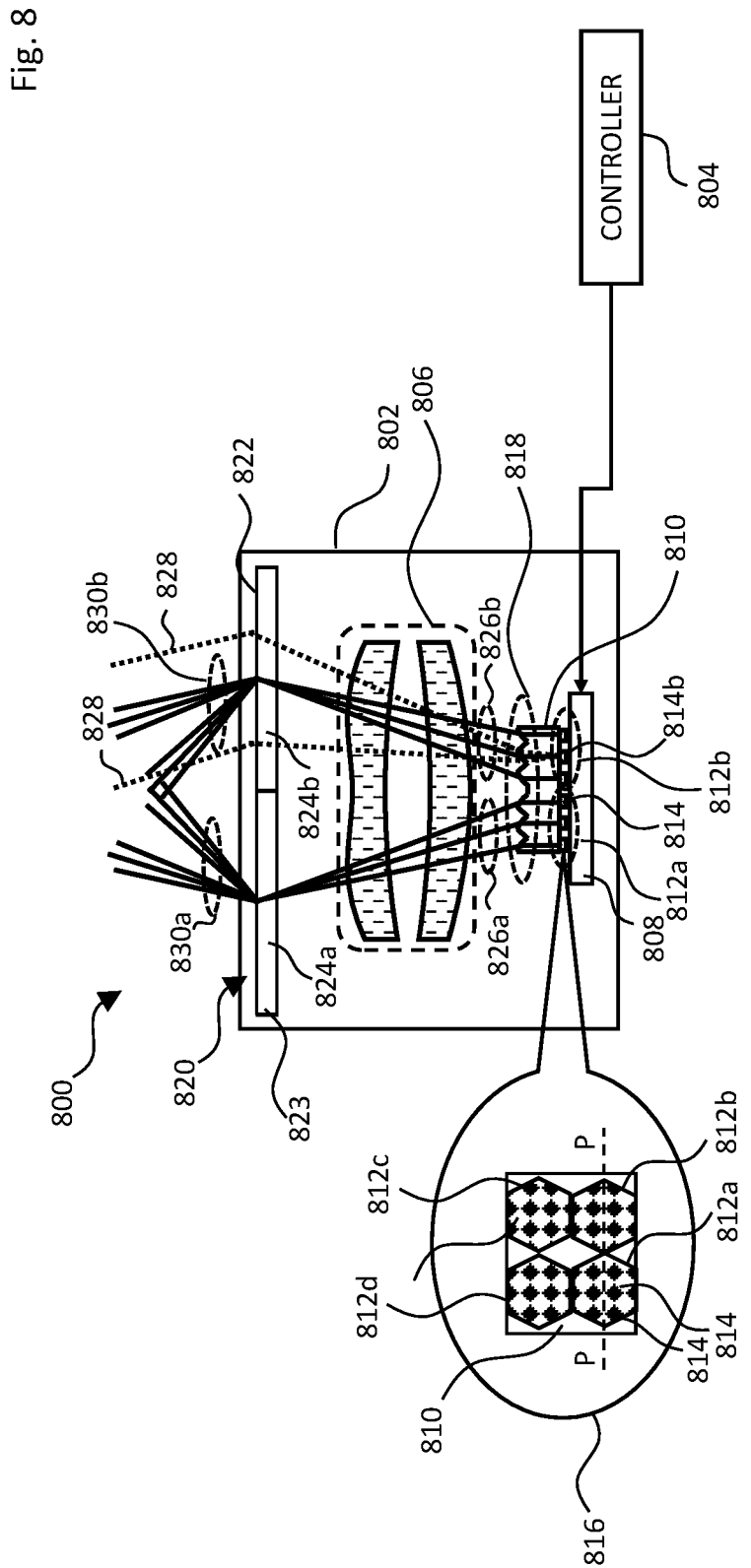
FIG. 8 is a schematic side view of an optoelectronic apparatus, in accordance with a further embodiment of the invention.

FIG. 8 is a schematic side view of an optoelectronic apparatus 800, in accordance with a further embodiment of the invention. Optoelectronic apparatus 800 comprises a spot projector 802 and a controller 804. Spot projector 802 is similar to spot projector 406 of apparatus 400 (FIG. 4A), with an added compound lens 806 for reducing the size of the projected spots on a target. Compound lens 806 may be more costly than the lenses shown in FIGS. 7A and 7B, but it may enable finer collimation of the beams emitted by apparatus 800, as well as reducing the width of apparatus 800 and sensitivity to decentering of the components.

Spot projector 802 comprises a Si substrate 808, comprising drive and control circuits, and a GaAs die 810 mounted on the Si substrate. GaAs die 810 comprises four VCSEL arrays 812*a*, 812*b*, 812*c*, and 812*d*, comprising VCSELs 814. GaAs die 810, together with VCSEL arrays 812*a*-812*d*, is shown in a schematic frontal view in an inset 816, with a line P-P corresponding to the plane of FIG. 8. GaAs die 810 also comprises an etched microlens array 818, similar to microlens array 422 (FIG. 4A). In addition to compound lens 806, the optics of spot projector 802 also comprise an MOE 820, comprising an optical metasurface 822 disposed on an optical substrate 823. Optical metasurface 822 comprises four optical apertures 824*a*, 824*b*, . . . , with respective diameters of 1.6 mm. (In the side view, only VCSEL arrays 812*a* and 812*b* and optical apertures 824*a* and 824*b* are visible.)

Compound lens 806 may be formed to reduce the aberrations of the beams emitted by VCSELs 814 in order to reduce spot sizes on the target, even for large VCSEL-arrays. Alternatively, the optical aberrations may be reduced by an additional MOE, either disposed on the bottom side of MOE 820 or fabricated on a separate substrate, which is either positioned adjacent to MOE 820 or cemented to it.

When VCSELs 814 of VCSEL arrays 812*a*, 812*b*, . . . , are driven by controller 804, they emit beams of optical radiation through GaAs die 810. The beams emitted by arrays 812*a* and 812*b* are refracted by microlens array 818 toward compound lens 806, with the beams denoted schematically by respective chief rays 826*a* and 826*b*. The refracted beams are further refracted by compound lens 806, and impinge on optical apertures 824*a*, 824*b*, . . . , of MOE, which collimate, tilt, and split the beams into respective sub-beams 830*a*, 830*b*, . . . , and direct them toward a target, illuminating the target with a spot pattern (not shown in this figure). The collimation of the beams is shown by marginal rays 828 emitted by a central VCSEL 814*b* in array 812*b*.

Alternative Flood Projector

Figure 9:
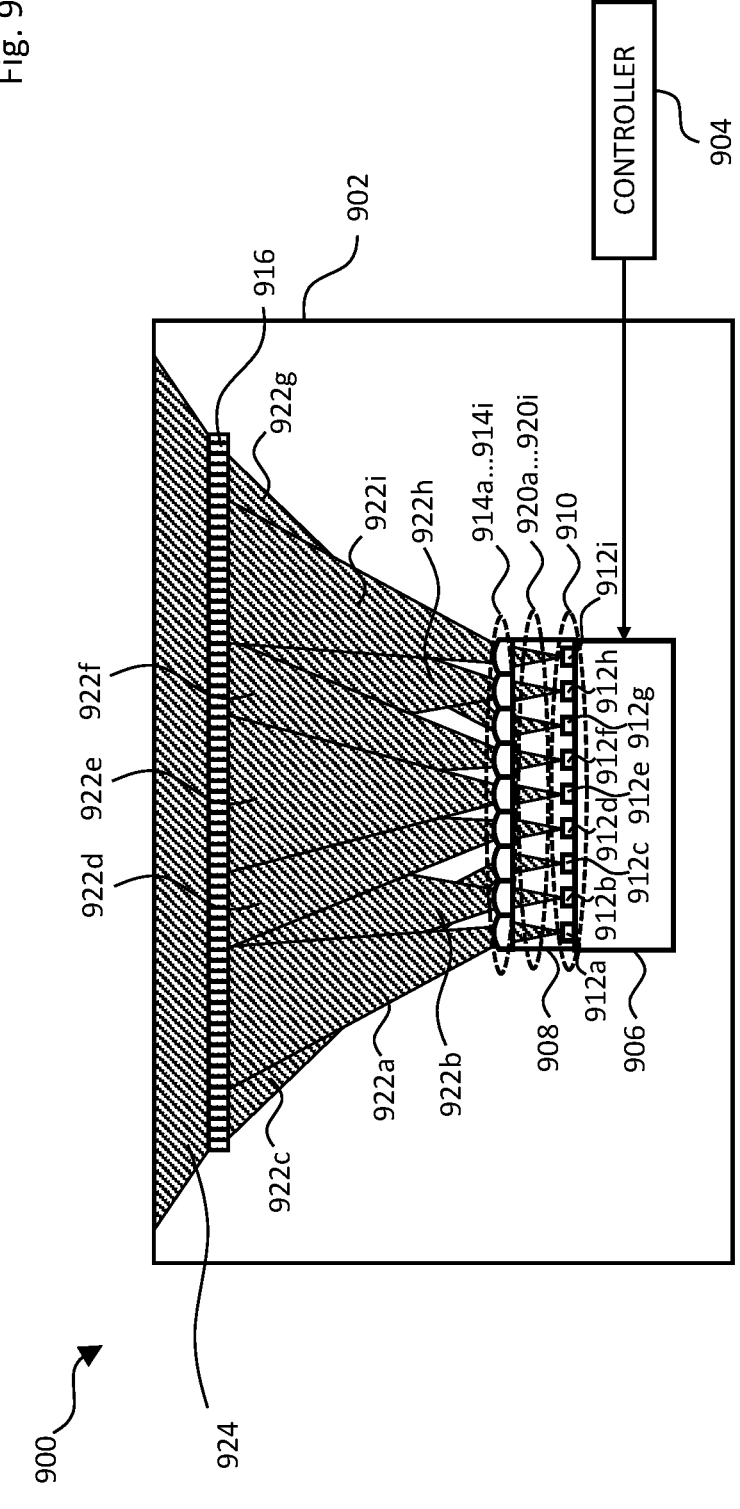
FIG. 9 is a schematic side view of an optoelectronic apparatus, in accordance with yet another embodiment of the invention.

FIG. 9 is a schematic side view of an optoelectronic apparatus 900, in accordance with yet another embodiment of the invention. Optoelectronic apparatus 900 comprises a flood projector 902 and a controller 904.

Flood projector 902 comprises a Si substrate 906, comprising drive and control circuits, and a GaAs die 908 mounted on the Si substrate. GaAs die 908 comprises a VCSEL array 910, comprising VCSELs 912*a*-9121. (Although only a single row of VCSELs is shown in this side view, die 908 may comprise a two-dimensional array of VCSELs as in the preceding embodiments.) VCSELs 912*a*-912*i* are formed on the back side of GaAs die 908, while microlenses, referred to as on-chip lenses (OCLs) 914*a*-914*i*, are formed on the front side. Each OCL is aligned with a respective VCSEL (for example, 914*a* to 912*a*), but offset laterally as will be detailed hereinbelow. Alternative embodiments may comprise VCSEL arrays with a higher or lower number of VCSELs, as well as either one-dimensional or two-dimensional arrays.

Flood projector 902 further comprises an MOE 916, which spreads and homogenizes the spatial and angular profile of light output by the projector.

When VCSELs 912*a*-912*i* are driven by controller 904, they emit respective beams of optical radiation 920*a*-920*i* through GaAs die 908. Beams 920*a*-920*i* impinge on respective OCLs 914*a*-914*i*, which refract them to beams 922*a*-

922*i*. Each of OCLs 914*a*-914*i* is decentered within the hexagonal aperture of respective VCSEL 912*a*-912*i* so that it steers the respective one of beams 922*a*-922*i* in a desired direction, causing the chief rays of some of the beams to cross with those of other beams. For improved compatibility with the manufacturing process, OCLs 914*a*-914*i* are paired so that each left-steered beam has as its counterpart a symmetrically positioned right-steered beam. Additionally or alternatively, the OCLs may have different, non-symmetrical sag profiles, resulting in different beam tilt angles. Further additionally or alternatively, the OCLs in flood projector may be toroidal, as in the embodiments described above, with appropriate tilt to cause the beams to cross as appropriate for the present embodiment.

In the pictured example, OCL 914*c* is offset so that beam 922*c* crosses beams 922*a* and 922*b*. The optical powers (focal lengths) of OCLs 914*a*-914*i* are chosen so as to reduce the numerical aperture (NA) of each of beams 922*a*-922*i* relative to the NA of beams 920*a*-920l. The NA of beams 920*a*-920*i* is typically 0.16-0.25, for example, while that of beams 922*a*-922*i* is lower, for example around 0.1. Due to the difference between the refractive indices of GaAs and air (3.5 vs. 1), however, the angular divergence of beams 922*a*-922*i* is larger than that of beams 920*a*-920*i*. Beams 922*a*-922*i* impinge on MOE 916, which diffracts the beams into multiple spread-out diffracted orders 924 that propagate toward a target (not shown in the figure).

The mutual crossing of beams 922*a*-922*i*, together with their divergence, spreads them uniformly across MOE 916, thus reducing the thermal load on the MOE and on any subsequent layers above the MOE. Furthermore, crossing of the beams reduces inhomogeneities in the flood illumination that might otherwise occur due to temperature differences among VCSELs 912*a*-912*i*, because the VCSELs at the center of the array tend to become substantially hotter than those in the periphery. MOE 916 is designed to diffract beams 922*a*-922*i* into a large number of overlapping diffracted orders in two dimensions, such as 100×100 orders, thus increasing the beam overlap on the target and providing highly diffuse flood illumination on the target with reduced tiling artifacts.

In an alternative embodiment, a random component may be added to the offsets and/or sag profiles of OCLs 914*a*-914*i* with respect to VCSELs 912*a*-912*i* in order to randomize the directions into which the OCLs steer beams 922*a*-922*i*. This kind of randomization increases the resilience of the system with respect to thermal power gradients. The offsets and/or sag profiles may further be utilized to adjust the overall shape of diffracted orders 924 exiting from flood projector 902 in order to accommodate functional and aesthetic considerations. The partial collimation (non-zero divergence) of beams 922*a*-922*i* reduces the size of MOE 916 required to accommodate these beams, while taking into account the tolerances of the NAs of the emitted beams 920*a*-920*i*.

Controller 904 typically drives VCSELs 912*a*-912*i* with pulses; for example, driving the VCSELs with 22 pulses of a duration of 33 µs per pulse, with an interval between the pulses of 205 µs, leads to a total flood illumination time (and hence to a total acquisition time of a target image) of 5.05 ms. In alternative embodiments, controller 904 may drive VCSELs 912*a*-912*i* with pulses of different durations and intervals, or alternatively with a drive current that is constant in time (DC current).

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optoelectronic apparatus, comprising:
   a semiconductor substrate;
   multiple arrays of emitters disposed on the semiconductor substrate and configured to emit beams of optical radiation;
   an optical substrate mounted over the semiconductor substrate;
   an optical metasurface disposed on the optical substrate and comprising multiple optical apertures, each aperture configured to receive, collimate and split the beams emitted by a respective array of the emitters into a respective group of collimated sub-beams, so as to direct the collimated sub-beams toward a target at different, respective angles to form a pattern of spots on the target; and
   multiple lenses disposed between the semiconductor substrate and the optical substrate in alignment with the multiple arrays of emitters and configured to direct the beams emitted by each array onto a respective one of the multiple optical apertures.

2. The apparatus according to claim 1, wherein the multiple lenses comprise discrete individual lenses, which are respectively aligned with the multiple arrays of emitters.

3. The apparatus according to claim 1, wherein the multiple lenses are formed as a monolithic unit.

4. The apparatus according to claim 1, wherein the multiple lenses are configured as a compound lens.

5. The apparatus according to claim 1, and comprising one or more dies of semiconductor material, wherein the arrays of emitters are disposed on respective ones of the one or more dies, and the one or more dies are mounted on the semiconductor substrate.

6. The apparatus according to claim 5, wherein the optical metasurface is configured to project the collimated sub-beams so that the target is tiled by images of at least one of the one or more dies.

7. The apparatus according to claim 5, wherein the optical metasurface has a focal plane, and the one or more dies comprise:
   at least one first die emitting first beams of the optical radiation at the focal plane, so as to form the pattern of spots on the target; and
   at least one second die emitting second beams of the optical radiation at an emission plane that is displaced by a predetermined distance from the focal plane, so that the second beams illuminate the target with flood illumination.

8. The apparatus according to claim 7, wherein the at least one first die has a first thickness, and the at least one second die has a second thickness greater than the first thickness by the predetermined distance.

9. The apparatus according to claim 7, wherein the at least one second die is mounted on a pedestal, which elevates the emission plane of the at least one second die relative to the at least one first die by the predetermined distance.

10. The apparatus according to claim 1, and comprising:
   one or more further arrays of emitters, which are disposed on the semiconductor substrate and are configured to emit further beams of optical radiation; and a further optical metasurface, which is configured to receive and split the further beams into diverging sub-beams, and to direct the diverging sub-beams toward the target at different, respective angles to illuminate the target with flood illumination.

11. The apparatus according to claim 10, and comprising a controller, which is configured to actuate the apparatus so as to illuminate the target with either the pattern of spots or the flood illumination.

12. The apparatus according to claim 1, wherein the arrays of emitters are disposed on a back side of at least one semiconductor die, and the apparatus comprises microlenses formed on a front side of the at least one semiconductor die in alignment with the emitters and configured to direct the emitted beams toward the optical metasurface.

13. The apparatus according to claim 12, wherein each microlens comprises a tilted toroidal surface.

14. The apparatus according to claim 1, wherein the pattern of spots comprises multiple replicas of the multiple arrays of emitters, wherein the replicas are tiled across the target.

15. The apparatus according to claim 1, wherein the pattern of spots comprises multiple replicas of the multiple arrays of emitters, illuminating different, respective zones of the target.

16. The apparatus according to claim 1, wherein the emitters comprise vertical-cavity surface-emission lasers (VCSELs).

17. The apparatus according to claim 1, wherein the multiple arrays are disposed on the semiconductor substrate in a hexagonal pattern.

18. The apparatus according to claim 1, wherein the multiple arrays are disposed on the semiconductor substrate in a rectangular pattern.

19. A method for optical projection, comprising:

mounting on a semiconductor substrate multiple arrays of emitters configured to emit beams of optical radiation;

mounting over the semiconductor substrate an optical substrate having an optical metasurface disposed thereon, the optical metasurface comprising multiple optical apertures, each aperture configured to receive, collimate and split the beams emitted by a respective array of the emitters into a respective group of collimated sub-beams, so as to direct the collimated sub-beams toward a target at different, respective angles to form a pattern of spots on the target; and disposing multiple lenses between the semiconductor substrate and the optical substrate in alignment with the multiple arrays of emitters and configured to direct the beams emitted by each array onto a respective one of the optical apertures.

\*　\*　\*　\*　\*